Aug. 13, 1963    A. P. MUSY    3,100,424
FLUID CONNECTION FOR A ROTATING CYLINDER HYDRAULIC MOTOR
Filed Sept. 7, 1960

INVENTOR
ANDRÉ PAUL MUSY
BY
ATTORNEYS

United States Patent Office 3,100,424
Patented Aug. 13, 1963

---

3,100,424
FLUID CONNECTION FOR A ROTATING CYLINDER HYDRAULIC MOTOR
André Paul Musy, Couvet, Neuchatel, Switzerland, assignor to Edouard Dubied et Cie (Societe Anonyme), Couvet, Neuchatel, Switzerland
Filed Sept. 7, 1960, Ser. No. 54,395
Claims priority, application Switzerland Sept. 10, 1959
2 Claims. (Cl. 92—106)

The present invention relates to a fluid coupling for an hydraulic actuating device or jack of a work holder for chuck grippers and the like of a machine tool device of the type operated by oil fed through distributing conduits in a rotatable hollow shaft connected to a cylinder housing a piston that is connected with the actuating spindle of the work holder and which spindle passes through the cylinder and the hollow shaft, with the oil selectively fed under pressure by said distributing conduits to opposite sides of the piston:

The main purpose of such a jack is to obtain a rapid and secure clamping of the work piece to be machined on the machine tool, while avoiding any complicated hand operations which necessarily are slow and tiresome for the operator. Thus, when this jack is used, the task of the operator during the working cycle is limited to the insertion of the work piece into the clamping member (chuck, grippers, etc.), followed by the actuation without any effort of a known hand or pedal-operated, oil introducing device for producing the hereinafter described hydraulic control, then followed by closing or opening (as the case may be) of the work piece holders prior and subsequent to machining the piece.

The known hydraulic actuating devices of this type have the drawback that their arrangements for distributing hydraulic control fluid provoke leaks that increase steadily with increasing wear resulting in a decrease of pressure and loss of the control fluid thus requiring the use of overdimensional pumps for feeding the hydraulic actuating device. Moreover, the rotating part of such arrangements for distributing control fluid is centered in a supporting bush secured to a part of the machine which requires a very great precision with respect to the concentricity of the rotating part and particularly to the centering of the stationary supporting bush with respect to the rotating part resulting in costly machining operations and in time and labor consuming adjustments of the principal parts constituting the actuating device.

It is a prime object of the present invention to eliminate the named drawbacks in a simple manner simultaneously insuring most economical working conditions while admitting a certain leakage of the control fluid for lubrication and the cooling of the elements of the device.

To this end according to the present invention in a hydraulic actuating device for the work holder of a machine tool, a supporting bush secured to the housing of the machine tool comprises between its bore and a rotatable hollow pipe, two groups of elements each of which, under the action of pressure fluid sources actuating the actuating device, alternately insures the sealing between said supporting bush and the rotatable hollow pipe.

Thereby each group of elements may consist of spacing rings non-positively connected with the supporting bush and of movable sealing rings, whereby pressure fluid fed alternately through conduits forces the lateral faces of said sealing rings against the spacing rings in order to prevent rotation of the sealing rings.

Further each pressure fluid source may cooperate with a group of elements comprising at least a pair of sealing rings provided with corresponding spacing rings placed on each side of the pressure fluid conduits.

The invention is capable of receiving a variety of mechanical expressions one of which is shown on the accompanying drawing, but it is to be expressly understood that the drawing is for the purpose of illustration only, and is not to be construed as a definition of the limits or scope of the invention, reference being had to the appended claims for that purpose. In the drawing, wherein like characters of reference are employed to designate the same parts in each of the figures:

Figure 1:
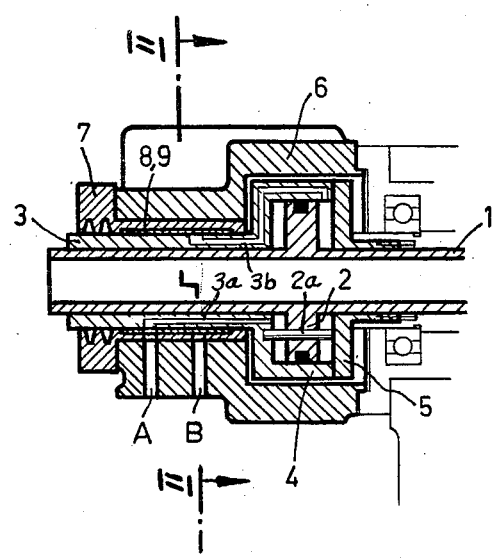
FIGURE 1 is a fragmentary elevational view, partly in section along the line I—I of FIGURE 2, of a hydraulic actuating device mounted on the spindle of a work holder of a machine tool.
Figure 2:
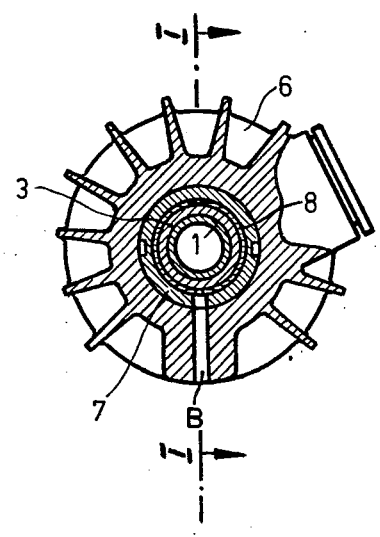
FIGURE 2 is a sectional view along the line II—II of FIGURE 1, of the actuating device according to the present invention.

According to the drawing, an hydraulic actuating device comprises a rotating spindle 1 of the work holder, being formed integrally with an annular piston 2, the positioning and peripheral entraining of which are obtained by a pin 2a traversing it and secured in side walls of cylinder 4. A rotatable hollow shaft 3 surrounds spindle 1 and is traversed by conduits 3a and 3b which leads pressure oil to a cylinder 4 which is secured to shaft 3 for moving the piston 2 that is integral wtih the rotating spindle 1 horizontally in one sense or the opposite sense, for clamping or unclamping the work holder. The conduits 3a and 3b open into the cylinder 4 on opposite sides of piston 2. The cylinder 4 is closed by a cover plate 5 provided on the rotating spindle 1. To the headstock of the machine is fixed a housing 6 carrying at its forward end a coaxial supporting bush 7, a portion of which is of smaller diameter than the housing 6 and is inserted into the inner bore of the housing 6. The supporting bush 7 houses in its portion that is inserted in the housing 6, the annular spacing rings 8 securely inserted into the supporting bush opening, the movable sealing rings 9 enclosing with a small amount of play the hub of the hollow shaft 3, and a stop ring 10 secured by pins 10a within the bush 7 and maintaining the spacing rings 8 and sealing rings 9 in place.

Figure 3:
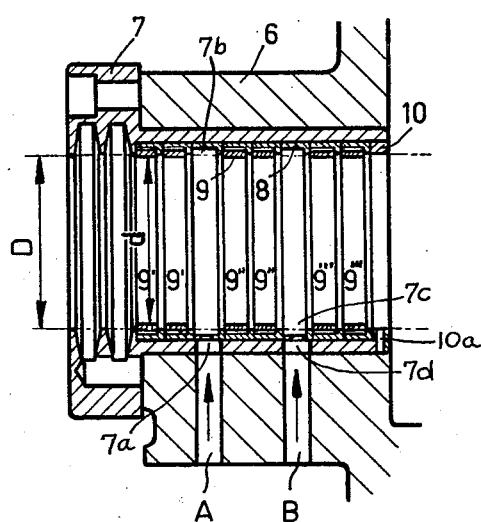
FIGURE 3 is an enlarged axial sectional view of a supporting bush incorporated into the device with the sealing members.

The pressure oil is fed by a conduit A and through an aperture 7a of the bush 7 to an annular channel 7b. This annular channel 7b is formed between two adjacent spacing rings 8 and as is shown in FIGURE 3, one of these two rings 8 is empty, that is, it has no sealing ring 9 therein. This empty ring 8 thus cooperates with the ring 8 immediately to the left of it in FIGURE 3 to define the annular channel 7b. In this channel 7b the oil encircles the hub of the hollow shaft 3. This oil then passes from channel 7b through conduit 3a (shown in FIGURE 1) to reach the cylinder 4 where it presses on the adjacent face of piston 2, thus moving the rotating spindle 1 to the right for unclamping the work holder in a manner not forming a part of this invention and well known to those skilled in the art. In this case, the oil formerly disposed in the cylinder 4 on the opposite side of piston 2 is returned to the oil reservoir through the conduit 3b, the peripheral channel 7c, the aperture 7d and a conduit B.

For clamping the work holder, i.e. for moving the rotating spindle 1 of the hydraulic actuating device to the left, pressure oil is fed to the conduit B which oil then passes through aperture 7d and annular channel 7c to conduit 3b and which thus enters the cylinder 4 on the right or inner side of piston 2.

For reasons of economy and to facilitate the machining operations and the adjustment and the working of the supporting bush 7 with respect to the housing 6 and to the rotatable hollow shaft 3, the supporting bush 7 is provided with a series of the said spacing rings 8 of angular section positively driven into the boring thereof. To the left and to the right of each of the circumferential channels 7b and 7c there are provided groups of two movable sealing rings 9, 9" and 9"', respectively.

The inner diameter $d$ of said sealing rings is selected so as to assure the desired play with respect to the outer diameter of the hub of the rotatable hollow shaft 3. This play is absolutely necessary for the rotation and at the same time allows expansion of the rotating parts when heated and for a sufficient lubrication thereof. The spacing rings 8 guide the sealing rings 9 laterally while leaving the latter free to automatically and freely center themselves with respect to the rotatable hollow shaft 3.

When the feeding of oil is effected through conduits A or B, it is the sealing rings 9', 9" or 9", 9"', respectively that insure a sealing between the supporting bush 7 and the shaft 3 as described below.

The diameter D of the supporting bush 7 and the collars of the spacing rings 8 is slightly larger than the external diameter $d$ of the hub of the shaft 3. The oil, therefore, presses the lateral faces of the sealing rings 9', 9" and 9"' against the faces of the spacing rings 8 and thus insures sealing in the axial direction, simultaneously fixing them through the friction between the faces in such a manner that their rotation is avoided. However, a certain amount of oil leakage is permissible for insuring sufficient lubrication and cooling.

What has been described is a hydraulic actuating device for a work holder that allows lower tolerances on the machined parts thereof while preventing oil leakage beyond a desirable amount for lubrication. The arrangement of parts that permits the actuating pressure oil to act also as lubricating oil cooperates with the moving and stationary parts to attain this end along with the operating advantages already recited.

I claim:

1. A rotary fluid coupling device comprising a rotatable hollow shaft having a pair of fluid conduits extending longitudinally thereof, a cylinder integral with said shaft into which said conduits open at different locations, a supporting bush for said shaft having a bore through which said shaft passes, a casing surrounding said bush, ring-like spacing elements mounted securely in said bore about the outer surface of said shaft, said spacing elements having lateral portions extending parallel with the axis of said bush and serving to position the elements securely in said bore, and said spacing elements having radially directed portions extending from said lateral portions toward said shaft, groups of ring-like sealing elements mounted with play on said shaft and disposed generally to lie concentrically within the lateral portions of a corresponding group of spacing elements, a spacing element between each group of said spacing elements in which a ring-like sealing element lies having a fluid passage in its lateral portion, said casing and said bush having aligned fluid conduits respectively communicating with each said fluid passage and through which hydraulic fluid under pressure may be introduced into annular passages defined by the respective last-named lateral portions of said last-named spacing elements and the outermost surface of said shaft and which annular passageways also communicate respectively with the fluid conduits in said hollow shaft, said ring-like sealing elements being movable axially on said shaft whereby under action of fluid under pressure introduced into said annular passages, lateral surfaces of said sealing rings are movable into sealing positions adjacent adjoining surfaces of radially directed portions of the spacing elements in which they lie.

2. The rotary fluid coupling device of claim 1 wherein there are three groups of spacing elements in each of which a ring-like sealing element lies and in which the spacing elements free of sealing rings are respectively positioned one between each of said three groups.

References Cited in the file of this patent

UNITED STATES PATENTS

| 2,458,343 | Carleton | June 18, 1949 |
| 2,536,565 | Ostergren | Jan. 2, 1951 |
| 2,577,858 | Sampson | Dec. 11, 1951 |
| 2,849,244 | Sampson | Aug. 26, 1958 |

FOREIGN PATENTS

| 293,543 | Great Britain | July 12, 1928 |
| 383,234 | Great Britain | Nov. 10, 1932 |
| 551,386 | Canada | Jan. 7, 1958 |